United States Patent [19]

Huxtable

[11] 4,439,902

[45] Apr. 3, 1984

[54] CLIP FOR SECURING AROUND A MEMBER SUCH AS A PIPE

[76] Inventor: Peter J. Huxtable, Merritts, Great Witley, Worcestershire, England

[21] Appl. No.: 268,064

[22] Filed: May 28, 1981

[30] Foreign Application Priority Data

Jun. 5, 1980 [GB] United Kingdom ............... 8018469
Jan. 6, 1981 [GB] United Kingdom ............... 8100256

[51] Int. Cl.³ .................................. B65D 63/00
[52] U.S. Cl. ............................... 24/278; 24/16 PB; 248/74 PB
[58] Field of Search ............. 24/278, 277, 276, 279, 24/16 PB, 275, 280, 284; 248/74 PB

[56] References Cited

U.S. PATENT DOCUMENTS

| 660,245 | 10/1900 | Bunte et al. | 24/278 |
|---|---|---|---|
| 1,382,813 | 6/1921 | Vitek | 24/278 |
| 1,600,765 | 9/1926 | Kenyon et al. | 24/278 |
| 2,330,898 | 10/1943 | King | 24/279 |
| 2,452,186 | 10/1948 | Fluharty | 24/278 |
| 2,502,156 | 3/1950 | King | 24/276 |
| 2,503,189 | 4/1950 | Biba, Jr. | 24/278 |
| 2,554,478 | 5/1951 | Williams | 24/276 |
| 3,744,096 | 7/1973 | Kok | 24/278 |

FOREIGN PATENT DOCUMENTS

| 1586690 | 8/1970 | Fed. Rep. of Germany | 24/278 |
|---|---|---|---|
| 340738 | 10/1904 | France | 24/278 |
| 544491 | 4/1942 | United Kingdom | 24/276 |

Primary Examiner—John J. Wilson
Attorney, Agent, or Firm—Scrivener, Clarke, Scrivener and Johnson

[57] ABSTRACT

Clips are known in which a worm wheel is meshed with teeth provided on an end portion of a band for encircling the member to be clamped, but such clips are relatively costly to produce and problems arise in maintaining the band threads meshed with the worm. Various clips are described in which an end portion of the band is provided on one side with external screw thread portions which are complementary to the internal screw threads of a nut through which the band end portion extends. The opposite end of the band may be integral with a body on which the nut is supported, or it may be identical to the first end portion also be meshed with the nut threads, so that both end portions of the band are drawn through the nut on turning of the nut.

4 Claims, 14 Drawing Figures

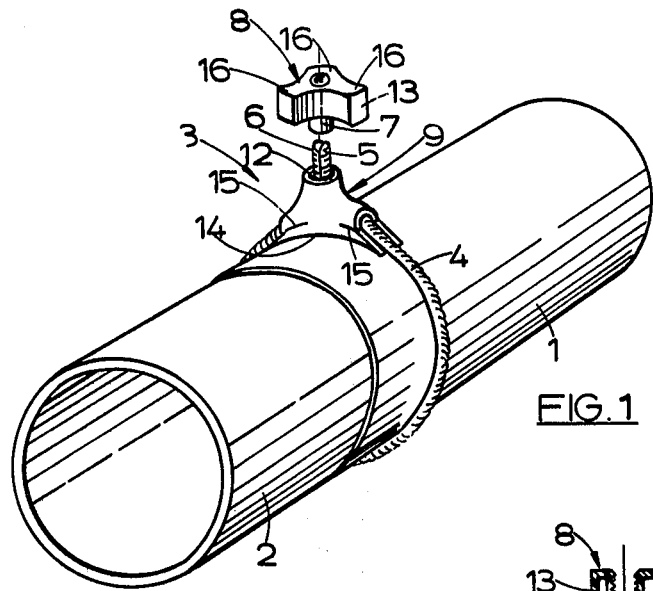
FIG. 1
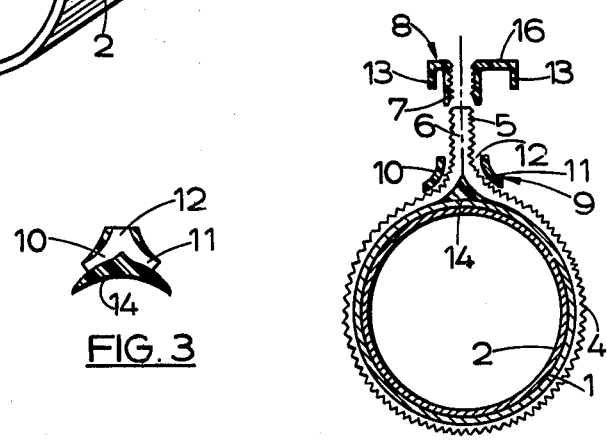
FIG. 2
  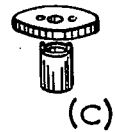 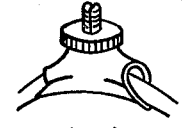
FIG. 3
FIG. 4
(a)  (b)  (c)  (d)

CLIP FOR SECURING AROUND A MEMBER SUCH AS A PIPE

This invention relates to a clip for securing around a member, such as a pipe. The member need not be of circular cross-section.

According to the invention a clip for securing around a member comprises a flexible strap for substantially encircling the member, at least one end portion of the strap of non-round cross-section being formed on one side with external screw thread portions which are adapted to mesh with complementary internal screw threads of a rotable nut, and the arrangement being such that on rotation of the nut in the appropriate direction the end portion is drawn through the nut to tighten the strap around the member.

With such a clip it is possible to achieve a more positive engagement between the thread portions on the band and the threads of the nut than is often achieved in clips of the kind which employ a worm engaging with rack teeth provided on the strap end portion.

Preferably the clip comprises a body against which the nut abuts and which is adapted to be located between the nut and the member.

The part of the body which engages with the member may be suitably shaped to cooperate therewith, and preferably it is of concave part-cylindrical shape to cooperate with a cylindrical member.

The body may be formed of any suitable material such as metal or plastics.

The body is preferably provided with guide means for slidably guiding the strap end portion towards the bore of the nut. The guide means could be one or more eyes projecting from the body, but preferably the guide means comprises a passage extending through the body.

The body is preferably formed by moulding.

In some applications it may be advantageous for the opposite end of the strap to be secured to the body, preferably by being formed integrally with the body, but usually it will be more advantageous to form the strap as an independent member and to arrange for both end portions of the strap to mesh with the nut threads, so that on rotation of the nut in the appropriate direction both end portions are drawn through the nut.

When both end portions of the strap pass through the nut the strap is preferably of constant cross-section throughout its length, apart from the provision of threads, and the threads are provided uniformly along the strap. This enables the strap to be cut to length to suit the particular application.

Also, the strap may then be formed by a continuous moulding or extruding process.

However, when only the end portions of the strap are formed with threads the intermediate portion of the strap may comprise means for adjusting the length of the strap, such as a buckle.

When both end portions of the strap pass through the nut they may be arranged in back-to-back engagement. When they are of equal cross-section they will, of course, then each be of half-round section.

Although a strap of half-round section is suitable for some applications, it will usually be preferable to employ a strap of flatter cross-section because such a strap can be made more flexible, and then a guide peg is preferably provided within the bore of the nut to abut with the strap and retain the threads of the end portion meshed with the nut threads.

When both end portions of the strap pass through the nut the backs of the strap end portions preferably oppose each other with the peg disposed between them. The peg will usually be integrally formed with the body to project therefrom.

The nut may be of any convenient form. It may be provided with flats for engagement by a spanner and/or it may be provided with finger-engageable formations to enable the nut to be turned by hand without the use of a tool.

The invention will now be further described, by way of example only, with reference to the accompanying drawings in which:

FIG. 1 is a perspective view of a clip in accordance with the invention shown assembled around a pipe joint, but with the nut shown dis-assembled;

FIG. 2 is a cross-section of the clip of FIG. 1 taken transversely of the pipes;

FIG. 3 is a longitudinal cross-section of a modified guide body for the clip of FIG. 1;

FIG. 4 shows various modified forms of nut for use with the clip of FIG. 1;

FIG. 8 is a plan view of the guide body of FIG. 6;

FIG. 9 is a plan view of the nut of the clip of FIG. 5;

FIG. 10 being a plan view, FIG. 11 being an end view, and FIG. 12 being a side view;

FIG. 13 is a side elevation of yet another clip in accordance with the invention employing an integral strap and guide body, the nut being shown in a disassembled position; and FIG. 14 is a plan view of the guide body of the clip of FIG. 13.

Figure 5:
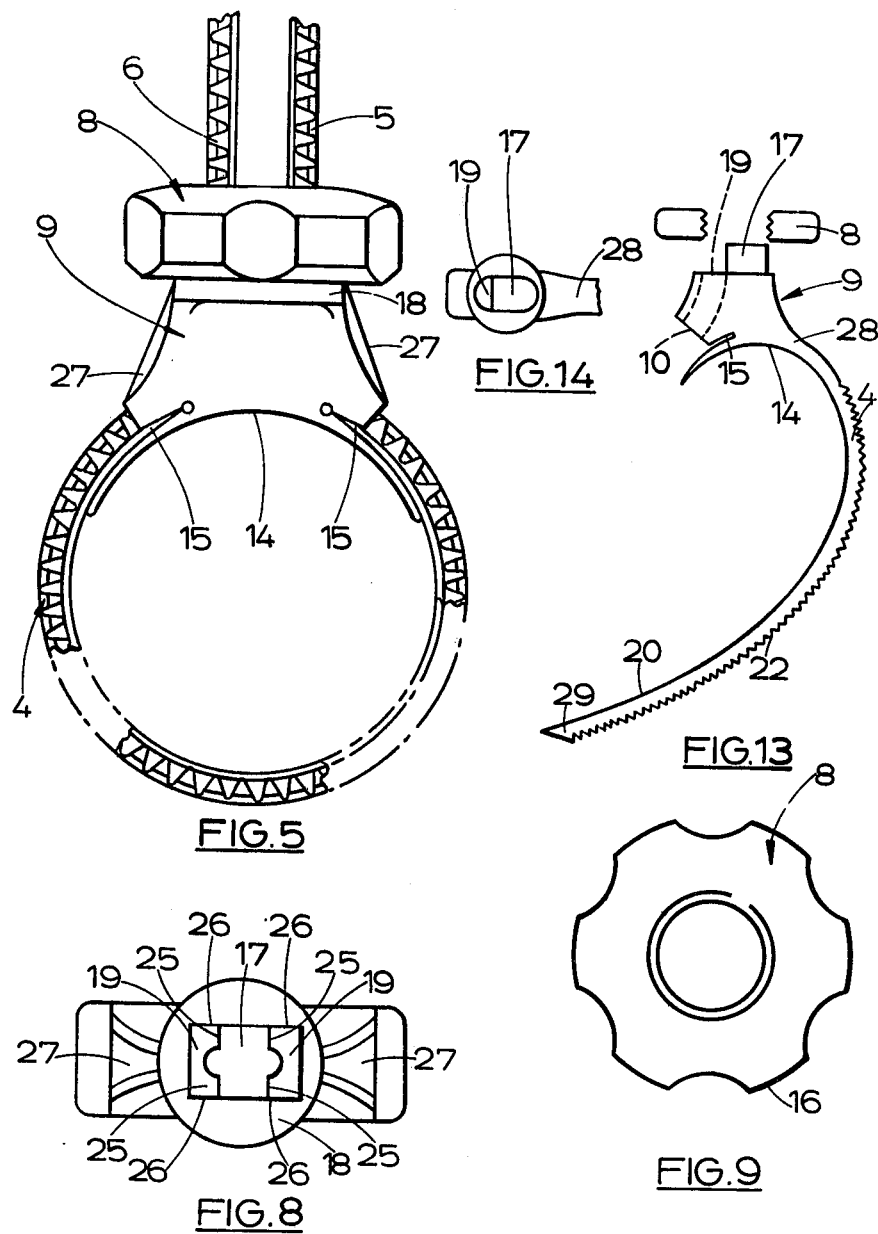
FIG. 5 is a side elevation of a further clip in accordance with the invention shown in an assembled condition.

With reference to FIGS. 1 and 2 two circularly cylindrical pipes 1 and 2 are clamped together by a clip 3 which comprises a plastics strap 4 which substantially encircles the pipes and has opposite end portions 5 and 6 arranged in back-to-back engagement. The strap 4 is of half-cylindrical shape throughout its length, and its curved surface is formed with 'half-threads' such that when the end portions 5 and 6 are placed in back-to-back engagement the 'half-threads' of the two ends portions combine to form complete threads which are threadedly engageable by the complementary internal threads formed on a tubular spigot 7 of a nut 8. Such a strap may be produced in continuous form by a continuous moulding technique, the continuous strap being cut into lengths to fit the circumference of the member to which the clip is to be applied.

A moulded plastics guide body 9 is provided, as shown in FIG. 2, with two converging passages 10 and 11 of half-cylindrical section and which are contiguous with a passage 12 of cylindrical cross-section. The arrangement of passages is thus of Y-configuration. Passage 12 is of a diameter sufficient to receive the spigot 7 so that when the nut 8 is assembled to the guide body a skirt 13 of the nut overhangs the guide body 9 to produce a clip of compact construction which does not project radially a substantial distance from the pipes.

Guide body 9 is formed with a base 14 which extends between the free ends of the passages 10 and 11 and is concave outwards, of a radius substantially to fit the outer surface of the pipe 1. Deformation of the base to conform to pipes of different diameters is facilitated by slits 15 formed in the opposed side walls of the body 9.

Skirt 13 is of substantially equilateral-triangular shape in plan to provide three finger-engageable projections 16, but various modified constructions of nut 8 are shown in FIGS. 4 (a) to (d). The nuts of FIGS. 4 (a) and (b) are of moulded plastics, whereas that of FIGS. 4 (c) and (d) is of separable two-piece metal construction.

FIG. 3 shows a modified guide body 9 in which the curvatures of the walls of passages 10 and 11 are slightly different from the body of FIGS. 1 and 2.

FIGS. 5 to 12 show a clip which incorporates a band of flatter cross-section than that of the clip of FIGS. 1 and 2. Such a strap can be made more flexible that a strap of half-round cross-section. Parts corresponding to those of the clip of FIGS. 1 and 2 have been given corresponding reference numerals in FIGS. 5 to 12.

Figure 6:
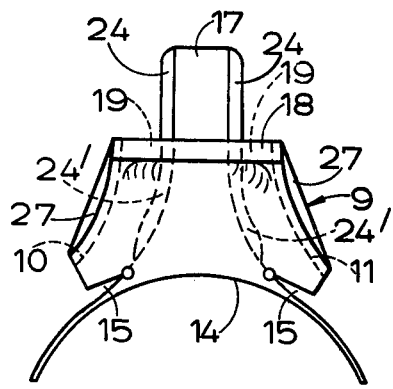
FIG. 6 is a side elevation of the guide body of the clip of FIG. 5, the independent guide passages being indicated in dotted outline.
Figure 7:
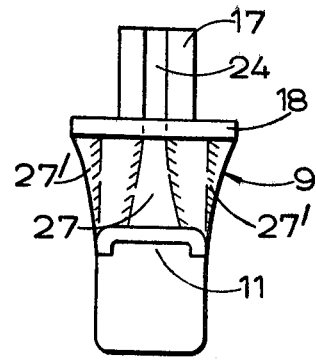
FIG. 7 is a view of the guide body looking from the right in FIG. 6.

With reference to FIGS. 6 and 7, the moulded plastics guide body 9 is provided with an integral peg 17 which projects upwardly above an abutment disc 18 on which is supported in use the nut 8. The height of peg 17 is equal to the thickness of nut 8 so that its top is flush with the assembled nut. The guide body 9 is provided in this case with two arcuate passages 10 and 11 which do not merge with each other, the open upper ends 19 of the passages being disposed on opposite sides of the base of the peg 17. The passages 10, 11 are of substantially oblong rectangular cross-section.

Guide body 9 is stiffened by the provision of integral external webs 27, 27'.

Figure 10:
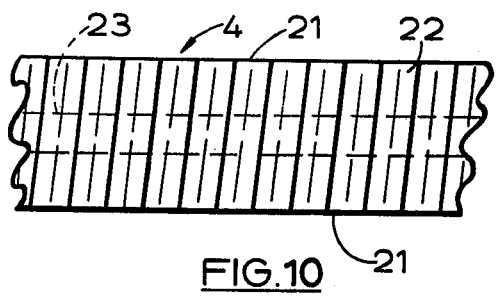
FIGS. 10, 11 and 12 are three views on a large scale of a portion of the strap of the clip of FIG. 5.
Figure 11:
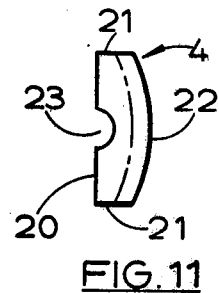
Figure 12:
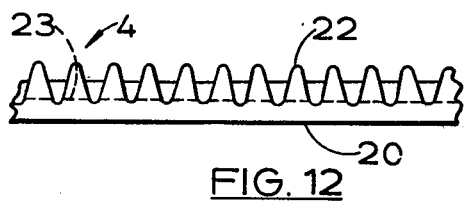

As shown in FIGS. 10 to 12, the moulded plastics flexible strap 4 has a flat rear face 20, flat side faces 21, and an arcuate, convex outwards, front face 22. The front face 22 is formed with thread portions which are complementary to the internal threads of the nut 8 to mesh therewith. The rear face 20 is provided with a longitudinal slot 23 of half-round cross-section and of complementary shape to opposed ribs 24 provided on the peg 17. The ribs 24 on peg 17 are contiguous with respective ribs 24 provided on the walls of passages 10, 11 for most of their length. The width of the strap between opposite side faces 21 is slightly less than the width of passages 10, 11 between the cooperating faces 26 shown in FIG. 8.

It will be appreciated that in the assembled clip the peg 17 extends within the nut 8 to hold the portions of the strap that are within the nut in threaded engagement with the nut threads, and that the straps are held against twisting by cooperation between flats 25 on the peg and the rear face 20 of the strap, and by cooperation between ribs 24, 24' and the slot 23.

In a modification, not shown, of the clip of FIGS. 5 to 12 the strap is of identical cross-section to that of FIG. 11 except that recess 23 is omitted, ribs 24 and 24' are omitted, and the cross-section of passages 10, 11 throughout their length is the same as that of the strap (with a sufficient clearence to permit sliding of the strap). Thus the openings 19 are of complementary cross-section to that of the strap. In addition, in order to improve the strength of the guide body 9 to resist the forces produced by the curved portions of the straps within passages 10, 11, the recesses in the body between the webs 27, 27' are omitted so that the outer surface of the body corresponds to an envelope which just includes the previously described webs.

FIGS. 13 and 14 show a further modification of the clip of FIGS. 5 to 12 in which the guide body 9 is integral with one end 28 of the strap 4 and the other end 29 is adapted to be passed through a single passage 10 provided in the guide body to enable the threads 22 to be engaged by the threads of nut 8 when the nut is in an assembled position on peg 17.

Instead of wrapping the band once only around a member, as shown in FIG. 1, for extra security and/or for dealing with small members, the band may be taken one or more further turns around the member before reinsertion through the guide body.

For members which are too large to be encircled by a band of a particular length, it would be possible to use two or more clips in combination, the band of one clip meshing with the nut of a second clip, and the band of the second clip meshing with the nut of the first clip, or with the nut of a third clip as the case may be.

I claim:

1. A clip for securing around a member comprising a flexible plastics strap of width substantially greater than the thickness thereof, opposite ends of said strap being formed on one side thereof with external screw thread portions, a body having a base for engagement with said member and an opposed abutment surface, a nut abutting with said abutment surface and having a bore provided with internal screw threads of complementary form to said external thread portions for meshing therewith, a peg depending from said body and upstanding from said abutment surface within said bore of said nut, said peg having opposed side faces which are spaced from said internal screw threads, said body being provided with a first pair of openings spaced a first distance apart in said abutment surface each opening being respectively adjacent to an opposed side face of said peg, with a second pair of openings respectively adjacent to opposite ends of said base and spaced a second distance apart greater than said first distance, and with a pair of guide passages each of which connects a respective one of said first pair of openings with a respective one of said second pair of openings for guiding said opposite ends of said strap into position in said nut in engagement respectively with said opposed side faces of said peg, each of said guide passages being arcuate along its entire length between said respective openings, whereby when said screw thread portions are meshed with said internal screw threads and said nut is rotated relative to said body both said strap ends are drawn through said nut to tighten said strap around said member, said body being formed of plastics material.

2. A clip as claimed in claim 1 wherein said base of said body is provided with a pair of slits positioned respectively adjacent to said second pair of openings whereby deformation of said base to conform to members of different diameters is facilitated.

3. A clip as claimed in claim 1 wherein said nut is formed of plastics material and is provided with finger-engageable projections.

4. A clip as claimed in claim 1 wherein said strap is of constant cross-section throughout its length, apart from the provision of threads, and the threads are provided uniformly along said strap.

* * * * *